US009654201B2

(12) United States Patent
Angeletti et al.

(10) Patent No.: US 9,654,201 B2
(45) Date of Patent: May 16, 2017

(54) METHOD AND A SYSTEM OF PROVIDING MULTI-BEAM COVERAGE OF A REGION OF INTEREST IN MULTI-BEAM SATELLITE COMMUNICATION

(71) Applicant: Agence Spatiale Europeenne, Paris (FR)

(72) Inventors: Piero Angeletti, Lisse (NL); Juan Camilo Lizarraga Cubillos, Leiden (NL)

(73) Assignee: Agence Spatiale Europeenne, Paris (FR)

( * ) Notice: Subject to any disclaimer, the term of this patent is extended or adjusted under 35 U.S.C. 154(b) by 374 days.

(21) Appl. No.: 13/778,926

(22) Filed: Feb. 27, 2013

(65) Prior Publication Data

US 2013/0244572 A1 Sep. 19, 2013

(30) Foreign Application Priority Data

Feb. 27, 2012 (EP) .................................... 12305233

(51) Int. Cl.
*H04B 7/185* (2006.01)
*H04B 7/204* (2006.01)
*H04W 16/12* (2009.01)

(52) U.S. Cl.
CPC ....... *H04B 7/18513* (2013.01); *H04B 7/2041* (2013.01); *H04W 16/12* (2013.01)

(58) Field of Classification Search
CPC .............. H04B 7/2041; H04B 7/18567; H04B 7/19513; H04W 84/06

(Continued)

(56) References Cited

U.S. PATENT DOCUMENTS 6,091,934 A 7/2000 Berman et al.
6,173,178 B1 1/2001 Hammill et al.
(Continued)

FOREIGN PATENT DOCUMENTS

EP 1 050 980 11/2000
GB 2 318 947 5/1998

OTHER PUBLICATIONS

Angeletti, P., et al.; "*Multiport Power Amplifiers for Flexible Satellite Antennas and Payloads*;" Microwave Journal, vol. 53, No. 5; dated May 2010; retrieved on Mar. 21, 2013 from <http://www.microwavejournal.com/articles/print/9430-multiport-power-amplifiers-for-flexible-satellite-antennas-and-payloads>.

(Continued)

*Primary Examiner* — Keith Ferguson
(74) *Attorney, Agent, or Firm* — Alston & Bird LLP

(57) ABSTRACT

A method of providing multi-beam coverage of a Region of Interest (ROI) in a multi-beam satellite communication system in which a non-uniform traffic demand density is defined over said Region of Interest, the method including partitioning the Region of Interest into N>1 non-overlapping cells ($V_1$-$V_{10}$, $V_i$); and generating N satellite beams, each of the satellite beams providing coverage of a respective cell. The step of partitioning the Region of Interest into N>1 non-overlapping cells is performed in such a way that the traffic demand associated to the cells is substantially uniform. Advantageously, the cells form a Voronoi diagram defined over the Region of Interest, the satellite beams being pointed towards the cells of the Voronoi diagram. A satellite communication system implementing the method is also provided.

14 Claims, 13 Drawing Sheets

(58) Field of Classification Search
USPC ... 455/12.1, 427, 429, 450, 446, 422.1, 403, 455/11.1, 550.1, 445, 428; 370/319, 316, 370/2, 323, 315; 342/354, 352, 372, 373
See application file for complete search history.

(56) References Cited

U.S. PATENT DOCUMENTS

| | | | |
|---|---|---|---|
| 6,813,492 B1 | 11/2004 | Hammill et al. | |
| 2004/0072570 A1* | 4/2004 | Smith | H04B 7/2041 455/446 |
| 2005/0190991 A1* | 9/2005 | McCleese | 382/294 |
| 2008/0055151 A1* | 3/2008 | Hudson et al. | 342/352 |

OTHER PUBLICATIONS

Anzalchi, J., et al.; "*Generic Flexible Payload Technology for Enhancing In-orbit Satellite Payload Flexibility*;", Proceedings of the 25th AIAA International Communications Satellite Conference (ICSSC 2007); dated Apr. 2007.
Arney, C., et al.; "*Models and Metrics of Geometric Cooperation*;" Proceedings of the 2010 Winter Simulation Conference; dated 2010.
European Search Report for Application No. 12305233; dated Oct. 10, 2010.
Jahnke, E., et al.; "*Tables of Functions with Formulae and Curves*;" 4th Ed., Dover, New York; dated 1945.
Khilla, M., et al "*Flexible Ka-Band LCAMP for In-Orbit Output Power Adjustable MPM*;", 23rd AIAA Int. Communications Satellite Systems Conf. (ICSSC), Rome, 2005.
Lloyd, S.P., "*Least Squares Quantization in PCM*;," IEEE Transactions on Information Theory, vol. IT-28; pp. 129-137; dated Mar. 1982; retrieved on Mar. 21, 2013 from <http://www.google.com/url?sa=t&rct=j&q=least%20squares%20quantization%20in%20pcm&source=web&cd=1&ved=0CDcQFjAA&url=http%3A%2F%2Fwww.nt.tuwien.ac.at%2Ffileadmin%2Fcourses%2F389075%2FLeast_Squares_Quantization_in_PCM.pdf&ei=y2tLUYTkLofe9ASAz4HIAw&usg=AFQjCNH0o9GeLuW1FvP0Mr8qRJHBvyNBsw&bvm=bv.44158598,d.eWU>.
Malarky, A., et al.; "*A Near-term Solution to Providing Flexibility in Multi-beam Communications Payloads*;", Proceedings of the 25th AIAA International Communications Satellite Conference (ICSSC 2007); dated Apr. 2007.
Max, J.; "*Quantizing for Minimum Distortion*;" IRE Transactions on Information Theory, vol. IT-6, No. 1; pp. 7-12; dated Mar. 1960.
Rinaldo, R., et al.; "*Non-Uniform Bandwidth and Power Allocation in Multi-Beam Broadband Satellite Systems*;", Proceedings of the 23rd AIAA International Communications Satellite Systems Conference (ICSSC 2005); dated Sep. 2005.

* cited by examiner

METHOD AND A SYSTEM OF PROVIDING MULTI-BEAM COVERAGE OF A REGION OF INTEREST IN MULTI-BEAM SATELLITE COMMUNICATION

FIELD OF THE INVENTION

The invention relates to a method of providing multi-beam coverage to a Region of Interest in a multi-beam satellite communication system. The invention also relates to a satellite communication system implementing said method.

BACKGROUND

Multibeam Ka-band satellites for Broad-Band Services (BBS) allow efficient use of orbit-spectrum and power resources, reducing the cost of the space segment and making the service competitive. One of the major challenges being faced by multibeam BBS networks is how to maximize Operator revenues while coping with a highly uneven traffic demand distribution over the coverage region.

The basic principle of multibeam satellite communication systems is to cover a specified Region of Interest (ROI) with a number of independent beams. Each independent beam exploits a portion of the available bandwidth. The isolation resulting from antenna directivity and the spatial separation between beams is exploited to re-use the same frequency band in separate beams. The same spectrum can be so re-used multiple times over the ROI. In practice, frequency re-use is limited by the achievable beam to beam isolation and interference rejection. The frequency re-use factor is defined as the number of times that the same frequency band is used. Frequency re-use allows increasing the total capacity of the satellite system without increasing the allocated bandwidth. Moreover, using polarization diversity—i.e. of two orthogonal polarization states—allows doubling frequency re-use without increasing interferences.

The traffic demand (load) experienced by a beam corresponds to the cumulative sum of the spatial traffic demand density—i.e. the traffic demand for unit surface of a small portion of the ROI—over its coverage area (footprint).

Standard coverage design of multibeam satellite communication systems assumes a uniform traffic demand on which a regular coverage lattice is overlaid (see FIG. 1). A hexagonal lattice of contiguous circular spot beams of equal size is known in prior-art to be the most efficient to guarantee a minimum variation of the satellite antenna gain over a ROI. The usefulness of the hexagonal layout can be understood observing that the worst-case (lowest) beam gain corresponds with the triple cross-over points between adjacent beams (i.e. with the hexagon vertices) since they lie at the greatest distance from the beam centre (corresponding to the beam peak gain). Simple geometrical reasoning shows that for a same centre-to-vertex distance a regular hexagon has a substantially larger area and requires fewer beams to cover the ROI than any other partition, i.e. based on square or triangular cells. FIG. 2 shows a frequency/polarization reuse scheme using four different "colours" (i.e. frequency/polarization pairs, e.g. two disjoint frequency bands and two orthogonal polarization states) applied to a hexagonal lattice of cells.

In multibeam systems with regular beams layouts, however, a uniform spatial traffic demand density can be expected to be a rather unrealistic scenario and a real non-uniform spatial traffic demand density will create traffic load imbalances among different beams. These imbalances make some beams to be working at their maximum yet not meeting the demand (overloaded) while others use a fraction of their potential capacity (underloaded). This translates into a situation in which part of the system capacity is left unused while there is still demand to be met. The overall effect is a serious limitation to the usability of the total system capacity.

Recent developments allow dealing with this problem by allocating the available resources according to the beam traffic demand, i.e. by transferring the unused capacity from the underloaded beams to the overloaded ones ("Usable Capacity Transfer" concept). The leading idea is to have a common pool of radio-frequency (RF) resources from which a channel can adaptively draw the RF power it requires. The achievement of this objective is strictly dependent on the architecture of the high-power RF section.

A known technique for providing flexible RF resource allocation to beams depending on traffic demand consists in using Multiport Amplifiers (MPAs). The main characteristic of a multi-port amplifier is that the signals corresponding to each input port are first split by an input matrix in such a way that the signals of all the beams are amplified by all the high power amplifiers (HPAs) [1]. Therefore equal loading of all the HPAs is achieved independently of the beams power distribution. Depending on the input port (beam) considered, the input matrix generates different relative phases at the HPA inputs. Then the output matrix coherently recombines the signals belonging to each input port to the corresponding output port.

U.S. Pat. No. 6,091,934 discloses another technique to ensure dynamic allocation of power to satellite's high power amplifiers to maintain amplifier efficiency and meet peak traffic demands and reduce power consumption during low traffic periods. This can be accomplished adjusting the RF output power from a Travelling Wave Tube Amplifier (TWTA) by changing its bias conditions. Such TWTAs with variable saturated RF power are also known as Flex-TWTAs [2]. In payload configurations based on Flex-TWTAs each individual TWTA can arbitrarily change (within a range that in current developments is about 3-4 dB) its saturated RF output power to match the traffic demand while maintaining an almost constant efficiency. The Flex-TWTAs must be operated such that their aggregated power consumption does not exceed the overall available DC power.

Architectures based on Flexible Travelling Wave Tube Amplifiers (Flex-TWTAs) and/or Multi-Port-Amplifiers (MPAs) combined with RF switch matrices, which allow fixed bandwidth channels to be routed between amplifiers, can also provide a certain degree of flexibility ([3-5]).

In any case, these techniques result in added complexity which usually comes along with several impairments such as interference, intermodulation, power losses, spectral efficiency loss, etc.

Furthermore, flexibility in bandwidth allocation contrasts with the need to reduce number of TWTAs in multibeam payloads, problem that in current systems (e.g. Anik-F2, KaSat, etc.) led to the introduction of high-power demultiplexers (HP-DEMUX) to share a single TWTA among multiple beams. This problem is of particular importance for payloads requiring significant increase in the number of beams beyond the technology employed by current systems.

U.S. Pat. No. 6,173,178 and U.S. Pat. No. 6,813,492 disclose a method of generating a non-uniform coverage of a Region of Interest. According to this method, beams of at least two different sizes are used to cover to ROI, larger beams being directed to regions having a lower traffic demand density, and smaller beams being directed to regions having a higher traffic demand density. These documents, however, do not provide any systematic method of designing the coverage, and therefore do not allow optimizing the performances of the communication system.

The invention aims at solving or attenuating the above-mentioned drawbacks of the priori art.

SUMMARY

An object of the present invention allowing to achieve this aim is a method of providing multi-beam coverage of a Region of Interest in a multi-beam satellite communication system, wherein a non-uniform traffic demand density is defined over said Region of Interest, comprising:

partitioning said Region of Interest into N>1 non-overlapping cells; and generating N satellite beams, each of said satellite beams providing coverage to a respective cell;

the method being characterized in that said step of partitioning said Region of Interest into N>1 non-overlapping cells is performed in such a way that an integrated traffic demand associated to said cells is substantially uniform. For example, the partitioning might ensure that the difference between the load (i.e. the integrated traffic demand) of any individual cell and an average load is not greater than 10%—or preferably 1%—of said average load. The traffic demand density can be measured or estimated, e.g. based on population density, market studies, etc.

Compared to the "Usable Capacity Transfer" concept discussed above, the inventive method requires a significantly simpler satellite payload, while allowing a similar—or even better—improvement of the overall usable capacity with respect to conventional systems based on a regular coverage of the ROI and on a uniform allocation of resources to the different beams. Compared to the method of U.S. Pat. No. 6,173,178 and U.S. Pat. No. 6,813,492, the partitioning of the ROI by non-overlapping cells having a substantially uniform traffic demand allows a simpler, more systematic design, increased flexibility and better performances.

The present invention is based on the consideration that the traffic load experienced by a beam (i.e. the traffic demand density integrated over the beam coverage area, or "integrated traffic demand") depends on two factors: the spatial distribution of traffic demand over the region of interest, and the beam's footprint. Given the former beforehand, the latter can be used to control the traffic load by providing a multibeam coverage design such that all beams are evenly loaded within a certain threshold. This concept can be named "Traffic Load Transfer".

According to specific embodiments of the invention:

Partitioning said Region of Interest into N>1 non-overlapping cells may be performed by an iterative algorithm comprising the steps of:

a. defining a set of N generator points distributed over said Region of Interest;

b. determining a set of N Voronoi cells associated to said generator points, partitioning said Region of Interest (i.e. forming a Voronoi diagram);

c. determining an integrated traffic demand for each of said Voronoi cells; and d. iteratively adjusting the positions of said generator points so as to make the integrated traffic demand associated to said Voronoi cells substantially uniform.

Said step d. of iteratively adjusting the positions of said generator points may be carried out by displacing the generator point corresponding to each Voronoi cell towards generator points whose corresponding Voronoi cells have a higher integrated traffic demand, and away from generator points whose corresponding Voronoi cells have a lower integrated traffic demand. More particularly, the displacement of each generator point may be expressed as a monotone—and preferably bounded—function of a vector sum of contributions associated to respective generator points others than the one to be displaced, each of said contributions having a magnitude which increases with difference in integrated traffic demand between the Voronoi cell corresponding to the respective generator point and the Voronoi cell of the generator point to be displaced, and which decreases with the distance between said generator points.

Said step d. of iteratively adjusting the positions of said generator points may be repeated until an absolute value of the difference between the traffic demand of each Voronoi cell and an average traffic demand becomes lower or equal to a predetermined threshold (e.g. 10% or even 1% of an average traffic demand), or until a predetermined number of iterations has been performed.

The method may comprise generating, for at least some of said Voronoi cells (and preferably for each said Voronoi cell), a circular satellite beam centred on a point of a respective Voronoi cell and having a width at half peak gain ("nominal width") which is an increasing function of an area of a convex hull of a traffic demand footprint underneath said Voronoi cell. More particularly, the nominal width of each said circular satellite beam may be approximated to the closest of M predetermined values with 1<M<N, said M values being chosen such that they minimize an average squared difference between the nominal and approximated widths, the nominal width of each beam corresponding to a beam area at half peak gain proportional to the area of sad convex hull of the traffic demand footprint underneath the corresponding Voronoi cell. Each of said beams may be centred on any point of the Voronoi cell it serves (for example the geometrical centroid or the barycentre of the traffic demand density underneath). The election of such a point may be done in a per beam basis.

The method may further comprise a step of assigning a frequency band and a polarization state to each satellite beam, the number of frequency band/polarization sate pairs ("colours") being lower than the number N of satellite beams, said step being performed so as to minimize the interference level between beams sharing a same frequency band and a same polarization state. For example, two non-overlapping frequency bands and two orthogonal polarization states (e.g. horizontal and vertical linear polarization, or left and right circular polarization) may be used.

Said step of assigning a frequency band and a polarization state to each satellite beam may comprise the following sub-steps:

i. assigning a frequency band and a polarization state to a satellite beam;

ii. for each satellite beam to which a frequency band and a polarization state have not been assigned, computing an interference level for each frequency band/polarization state pair;

iii. provisionally allotting to each said satellite beam to which a frequency band and a polarization state have not been assigned the frequency band/polarization state pair with the lowest interference level;

iv. identifying, among said satellite beams to which a frequency band/polarization state pair has been provisionally allotted, the one which is affected by the highest interference level, and assigning it the provisionally allotted frequency band/polarization state pair; and v. repeating sub-steps ii.-iv. until all the satellite beams have been assigned a frequency band and a polarization state.

Another object of the present invention is a satellite communication system comprising at least one satellite directing N>1 satellite beams toward a Region of Interest over which a non-uniform traffic demand density is defined, said Region of Interest being partitioned into N non-overlapping cells and each said satellite beam being directed so to provide coverage of a respective cell, characterized in that said Region of Interest is partitioned in such a way that the integrated traffic demand associated to said cells is substantially uniform. For example, the partitioning might ensure that the difference between the load (i.e. the traffic demand) of any individual cell and an average load is not greater than 10%—or preferably 1%—of said average load. Again, the traffic demand density can be measured or estimated, e.g. based on population density.

According to specific embodiments of the invention:

Said cells may form a Voronoi diagram defined over said Region of Interest, each satellite beam being centred on a point of a respective Voronoi cell. For example, a beam can be centred on the geometrical centroid or on the barycentre of the traffic demand density within the corresponding Voronoi cell.

Said satellite beams may be circular and each of them may have a width at half peak intensity which is an increasing function of an area of a convex hull of a traffic demand footprint underneath the corresponding Voronoi cell. For example, the circular footprint of each satellite beam may have a surface equal to—or proportional to, or more generally which is an increasing function of—the surface of a convex hull of the traffic demand underneath the corresponding Voronoi cell.

The width of each said circular satellite beam may be chosen among M values, with 1<M<N, said M values being chosen such that they minimize an average squared difference between said widths and nominal widths of the beams the nominal width of each beam corresponding to a beam area at half peak gain having a surface proportional to the area of said convex hull of the traffic demand underneath the corresponding Voronoi cell.

A frequency band and a polarization state may be assigned to each satellite beam, the number of frequency band/polarization sate pairs ("colours") being lower than the number N of satellite beams, the assignment being performed so as to minimize an interference level between beams sharing a same frequency band and a same polarization state. For example, two non-overlapping frequency bands and two orthogonal polarization states (e.g. horizontal and vertical linear polarization, or left and right circular polarization) may be used.

BRIEF DESCRIPTION OF THE DRAWINGS

Additional features and advantages of the present invention will become apparent from the subsequent description, taken in conjunction with the accompanying drawings, wherein.

DETAILED DESCRIPTION

Telecommunication satellites provide a radio relay to certain Region Of Interest (ROI). Instead of covering the entire ROI with one single satellite high power beam, the satellite payload can be equipped a multibeam antenna where each beam of smaller size (i.e. of higher gain) serves a part of the ROI thus allowing frequency reuse.

Frequency reuse refers to the use of satellite transponder channels on the same frequency/polarization to cover different areas of the ROI which are separated from one another by sufficient distance so that co-channel/co-polar interference is not objectionable. It results in a system capacity increase proportional to the reuse factor.

Each beam primarily covers an area, defined "cell", where the beam gain is sufficiently high. A cell thus signifies the area in which a particular satellite beam is most likely to serve a User Terminal geographically located within the cell.

The traffic distribution density can be represented by a function $f: \Re^2 \rightarrow \Re$ providing the traffic demand per unit area as a function of geographical position (x,y). Its domain $(x,y) \in A$ corresponds to the bi-dimensional ROI (e.g. represented in latitude and longitude coordinates or in antenna coordinates) as seen from the satellite and its range to the associated traffic demand density (e.g. expressed in megabit per second, Mbps). For avoiding dealing with traffic units, an adimensional traffic demand density normalized to the total traffic demand will be used from now on:

$$\hat{f}(x, y) = \frac{f(x, y)}{\iint_A f(x, y) dx dy} \quad (1)$$

From a mathematical standpoint the multibeam coverage corresponds to a partitioning of the domain of definition of $\hat{f}(x,y)$ in cells filling the ROI with no overlaps and possibly no gaps.

From a system point of view, the geometrical distribution of the cells does not need to be regular, and the cells need not have any particular shape.

Such partitioning is made by means of planar ordinary Voronoi diagrams. These diagrams are a simple yet powerful tool that is used in a variety of fields. In its simplest form a Voronoi diagram divides the XY plane in a unique way depending on a finite set of generator points $\{p_1, \ldots, p_N\}$. By definition the i-th cell ($V_i$) of the partition corresponds to the set of (x,y) points which are closer to the generator point $p_i$ than to any other generator point $p_j$, thus there are as many cells as generator points and every cell is associated to one and only one of them (and vice versa). A formal mathematical definition of the Voronoi diagram is found below.

Figure 1:
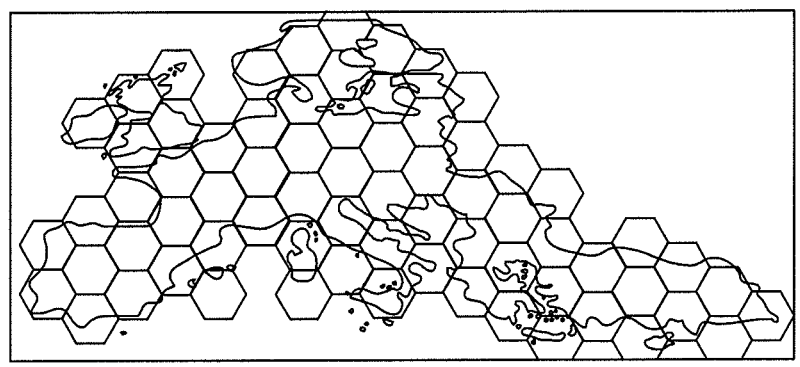
FIG. 1 shows a standard coverage design of a multibeam satellite communication system that assumes a uniform traffic demand on which a regular coverage lattice is overlaid.
Figure 2:
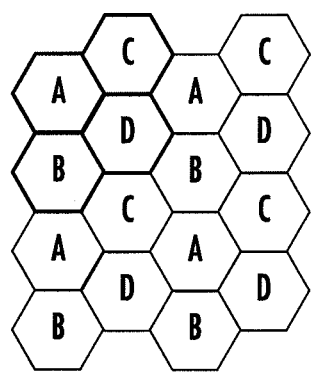
FIG. 2 shows a frequency/polarization reuse scheme using four different "colours" applied to a hexagonal lattice of cells.
Figure 3:
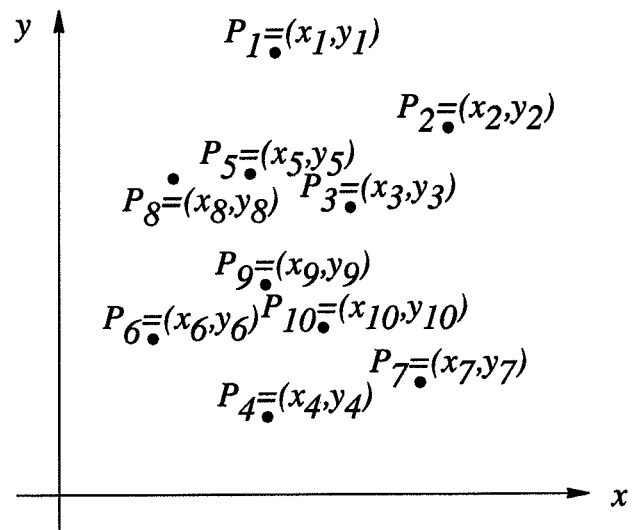
FIG. 3 shows a distribution of generator points over a rectangular ROI.

Let us introduce the set of generator points $P=\{p_1, \ldots, p_N\} \subset \mathfrak{R}^2$, where N is the number of beams, $2<N<\infty$, $p_i=(x_i,y_i)$ and $p_i \neq p_j$ for $i \neq j$, $i, j \in I_N=\{1, \ldots, N\}$ (see FIG. 3).

The region given by:

$$V(p_i)=\{x \| \|x-p_i\| \leq \|x-p_j\| \text{ for } i \neq j, 1 \leq i,j \leq N\} \quad (2)$$

is the planar ordinary Voronoi polygon or Voronoi cell associated with $p_i$ and the set given by:

$$V=\{V(p_1), \ldots, V(p_N)\} \quad (3)$$

is the planar ordinary Voronoi diagram generated by P. Point $p_i$ of $V(p_i)$ is known as the generator point, generator or Voronoi site of the i-th Voronoi cell, and the set $P=\{p_1, \ldots, p_N\}$ the generator set of the Voronoi diagram V. For brevity, the following notation will be used:

$$V_i = V(p_i) \quad (4)$$

Figure 4:
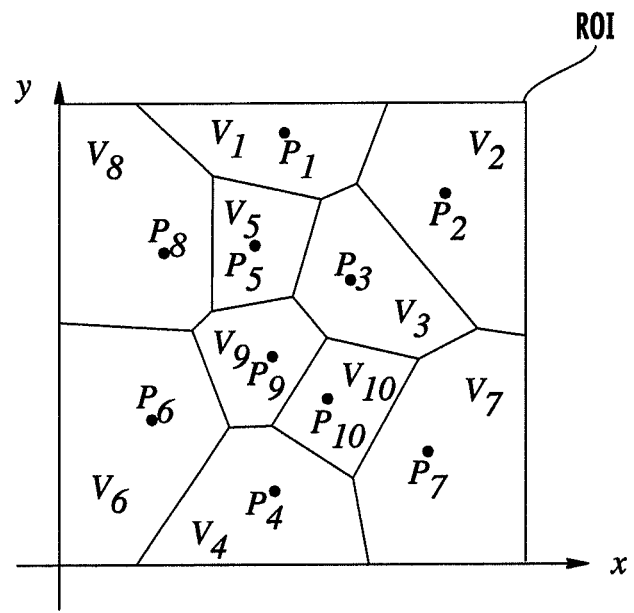
FIG. 4 shows the Voronoi diagram generated over said ROI by said generator points.

Voronoi cells are known to be convex polytopes that, when confined within a convex region of interest, tessellate it into convex polygons (see FIG. 4). Each of these polygons would ideally correspond to a beam's footprint, but in practice, due to technological limitations (it may not be possible to achieve such a level of beam shaping), it represents the area in which the gain of a particular satellite beam is high enough so it is most likely to serve a User Terminal geographically located within the polygon.

The set of generator points conditions the number, size, geometry and position of the resulting cells, therefore controlling it means controlling all properties of the partition. According to the invention, the set of generator points is determined in order to balance the traffic load (although other criteria may also be taken into account).

Following the normalization presented in (1) and the nomenclature introduced in (4), traffic quantities related to the Voronoi cells are defined as follows:

$\hat{L}_i$: normalized load of the i-th beam.

$$\hat{L}_i = \frac{\int_{V_i} f(x,y) dx dy}{\int_A f(x,y) dx dy} = \int_{V_i} \hat{f}(x,y) dx dy \quad (5)$$

$\hat{L}_{Goal}$: normalized load goal for a single beam.

$$\hat{L}_{Goal} = \frac{1}{N}; \quad N = \text{number of beams} \quad (6)$$

$\hat{L}_{Th}$: normalized load deviation threshold for a single beam.

$$\hat{L}_{Th} = q \cdot \hat{L}_{goal}, q<1 \quad (7)$$

The coverage shaping is made through an iterative process in which the different Voronoi generator points are moved until the following condition is met:

$$|\hat{L}_i - \hat{L}_{Goal}| \leq \hat{L}_{Th} \forall i \quad (8)$$

Figure 5:
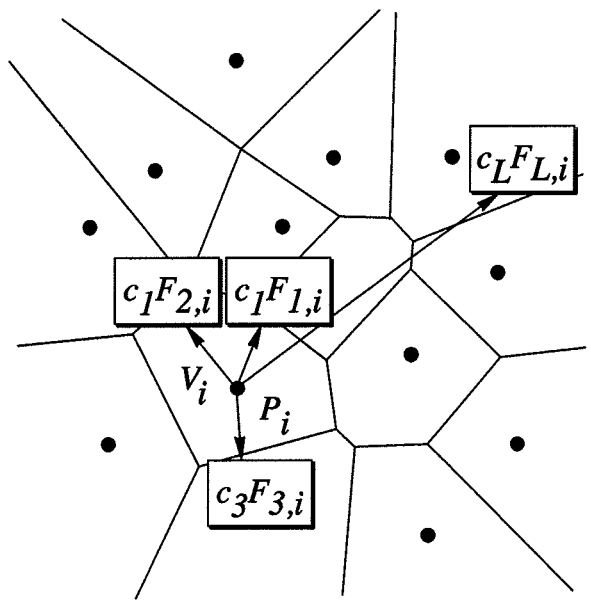
FIGS. 5 to 8 illustrate the displacement of generator points to achieve optimal Traffic Load Transfer.

The movement resemble a molecular diffusion process and is mainly driven by traffic load gradients, but other contributions may be accounted for. In analogy with the molecular diffusion process, one can think of a force $F_i$ as the responsible for the movement of the i-th Voronoi generator point $p_i$. This force can be expressed as the weighted sum of different contributions, as illustrated by FIG. 5. Equation (9) reflects this fact and emphasizes how if the appropriate weighting coefficients $c_k$, $c_L$ are chosen then the main contributor is the one due to traffic load gradients ($F_{L,i}$).

$$F_i = \sum_k c_k F_{k,i} = c_L F_{L,i} + \sum_{k \neq L} c_k F_{k,i} \quad (9)$$

Figure 6:
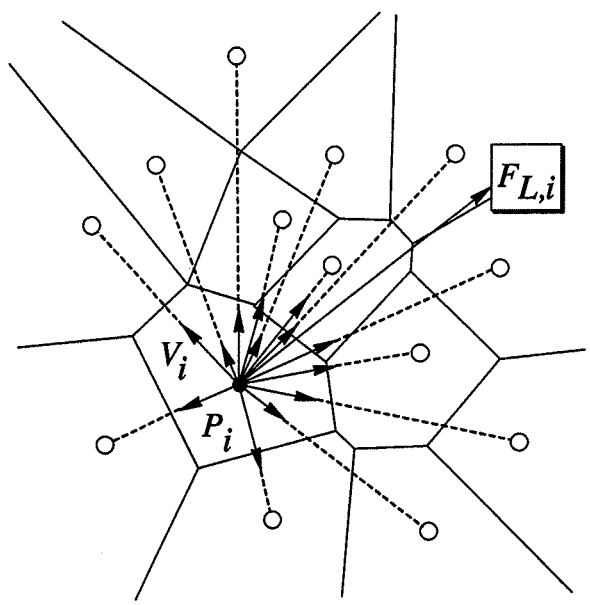

The gradient, however, is an operator that works only with derivable (smooth) functions which is not the case of the N sparsely located Voronoi generator points. Hence it is necessary to define an operation that provides a similar functionality, but at the same time is capable of dealing with the mathematical nature of the present problem. Thus, let $F_{L,i}$ be defined as the load gradient experienced by the i-th Voronoi cell $V_i$ at $p_i$ and calculated according to:

$$F_{L,i} = \sum_{j \neq i} \frac{\lambda_{ij}}{r_{ij}^s} \hat{u}_{r_{ij}} \quad (10)$$

where $r_{ij}=\|p_i-p_j\|$, $\lambda_{ij}=\lambda(\hat{L}_i, \hat{L}_j)$, $s \in \mathfrak{R}$ and $\hat{u}_{r_{ij}} = r_{ij}/|r_{ij}|$ is the unitary vector from $p_i$ to $p_j$. Equation (10) replaces the gradient operator by a system of forces acting over $p_i$, as illustrated on FIG. 6.

A similar definition may be used as well for other contributions to the system such that:

$$F_{k,i} = \sum_j \mu_{k,ij} \hat{u}_k \quad (11)$$

where $\mu_{k,ij}=\mu_k(p_i,p_j,V_i,V_j,\hat{f}(x,y))$ is a generic function.

Figure 7:
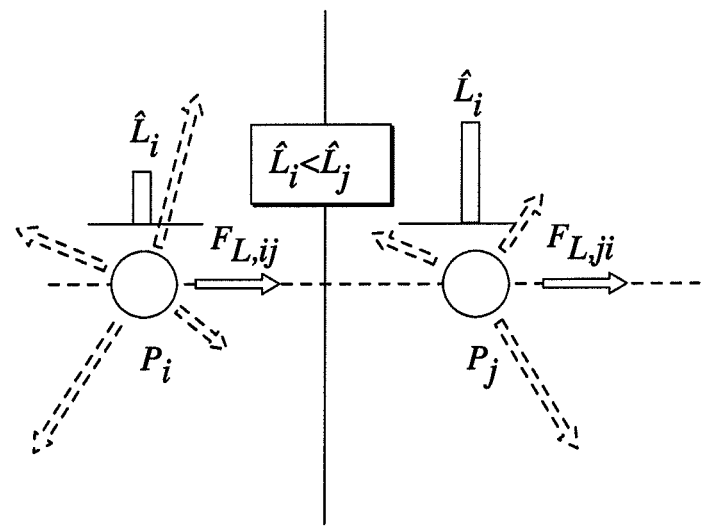

A particular implementation of $F_{L,i}$ that has proved to be effective is detailed below in equation (12). The reason why this particular implementation is proposed is because the numerator resembles $-\nabla L$ for discrete functions and the denominator follows the inverse square decay law which happens to be usual in nature (e.g. gravitation, Coulomb's law). According to equation (12) $F_{L,i}$ can be expressed in terms of an attractive and repulsive forces. In other words $p_i$ is going to be attracted towards those $p_j$ that are more loaded than it, but it is going to be pushed away from those $p_j$ that are less loaded. The global effect is that underloaded beams move towards overloaded beams trying to claim part of their load while the latter move away to facilitate the process; see FIG. 7

$$\lambda_{ij} = -(\hat{L}_i - \hat{L}_j) \quad (12)$$
$$s = 2$$

$$F_{L,i} = {}_aF_{L,i} + {}_rF_{L,i} = \sum_{i \neq j | \hat{L}_i < \hat{L}_j} \frac{\hat{L}_j - \hat{L}_i}{r_{ij}^2} \hat{u}_{r_{ij}} + \sum_{i \neq j | \hat{L}_i > \hat{L}_j} \frac{\hat{L}_i - \hat{L}_j}{r_{ij}^2} (-\hat{u}_{r_{ij}}) \quad (13)$$

The total force $F_i$ over $p_i$ is transformed into actual movement by means of a "diffusion coefficient" D. Let $s_{vf,i}$ be the viscosity-free displacement vector of $p_i$ defined by:

$$s_{vf,i} = F_i D \quad (14)$$

Figure 8:
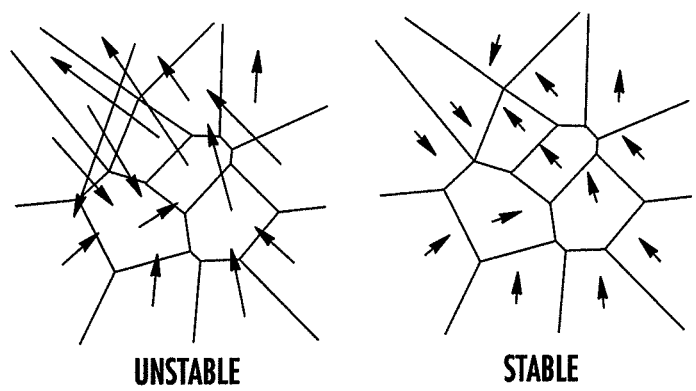

Depending on the value of D the resulting displacement vectors may result in large movements. Large movements lead to an unstable system, as illustrated on FIG. 8. For avoiding numerical instability of the iterative optimization process the concept of "simulated viscosity" is introduced.

Generally speaking, viscosity is defined as a fluid internal resistance to flow. It is incorporated into the system as resistance to the Voronoi generator points movement. The actual viscosity implementation is done in a per Voronoi cell basis. Let $s_i$ be the viscosity-bound displacement vector of $p_i$. The relation between $s_i$ and $s_{vf,i}$ is given by:

$$s_i = v_i s_{vf,i} \text{ with } v_i < 1 \tag{15}$$

where $v_i$ is the viscosity experienced $p_i$, by and:

$$v_i = \frac{|s_i|}{|s_{vf,i}|} \tag{16}$$

Figure 9:
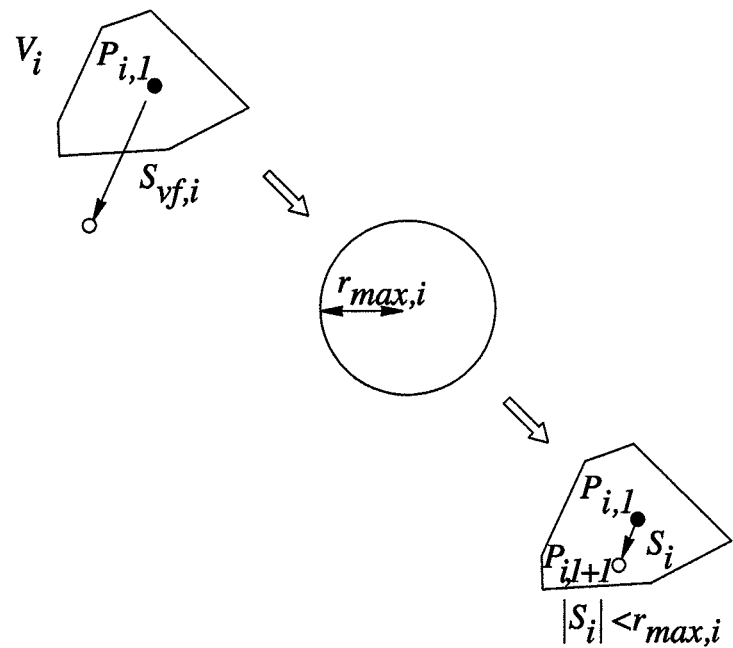
FIGS. 9 and 10 illustrate the use of "simulated viscosity" to bound the displacements of generator points.

For each Voronoi cell $V_i$ an equivalent area circle of radius $r_{max,i}$ is calculated such that it is guaranteed the displacement associated to $p_i$ will remain within said circle (see FIG. 9):

$$|s_i| < r_{max,i} \tag{17}$$

The relation between $s_i$ and $s_{vf,i}$ is governed by equation (18) and viscosity is given by (19) accordingly.

$$s_i = e\left(1 - \frac{1}{1 + |s_{vf,i}|/2}\right)^{1+|s_{vf,i}|/2} r_{max,i} \frac{s_{vf,i}}{|s_{vf,i}|} \tag{18}$$

$$v_i = \frac{|s_i|}{|s_{vf,i}|} = e\left(1 - \frac{1}{1 + |s_{vf,i}|/2}\right)^{1+|s_{vf,i}|/2} \frac{r_{max,i}}{|s_{vf,i}|} \tag{19}$$

Figure 10:
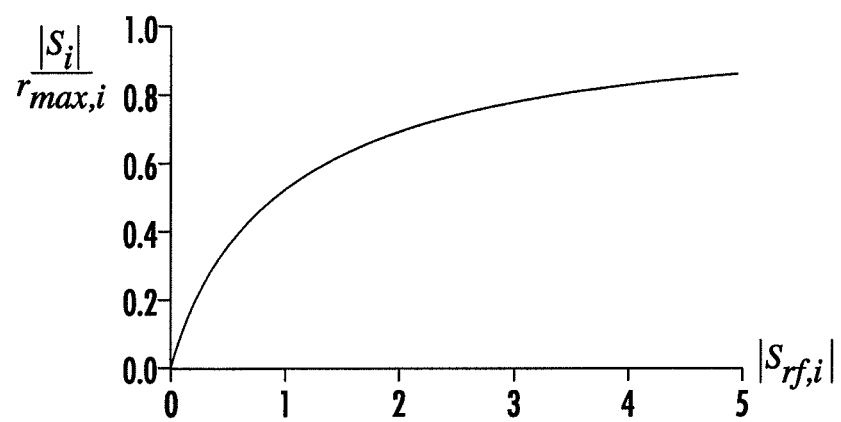

FIG. 10 shows that $|s_i|$ tends asymptotically towards $r_{max,i}$ as $|s_{vf,i}|$ increases.

Once $s_i$ is calculated, then the new position of $p_i$ is given by the following equation, $$p_{i,t+1} = p_{i,t} + s_i \tag{20}$$

Figure 11:
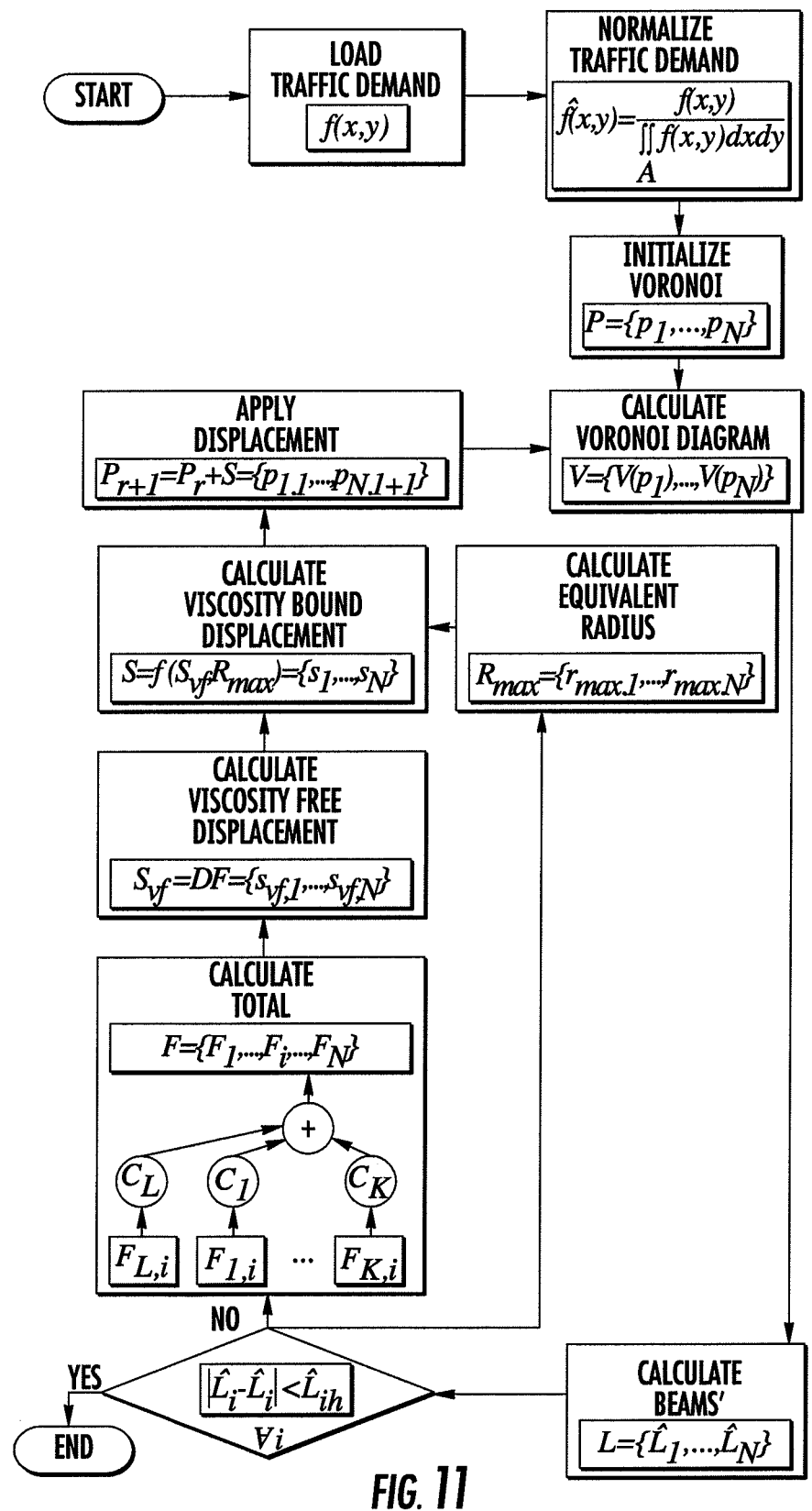
FIG. 11 is a flow-chart of the algorithm determining the displacement of generator points.

Summarizing, in each iteration of the process there is a set of N Voronoi generator points $P=\{p_1, \ldots, p_N\}$, corresponding to N beams, for which an associated Voronoi diagram is calculated along with the traffic load it causes to each of them. With this information a viscosity-bound displacement vector $s_i$ is calculated for each $p_i$ in P. All $p_i$s are then moved according to their $s_i$ and the process starts over until condition (8) is met. The initial set P may be randomly generated using the traffic distribution $\hat{f}(x, y)$ as the probability density function. The flow diagram of the algorithm is shown in FIG. 11.

Figure 20:
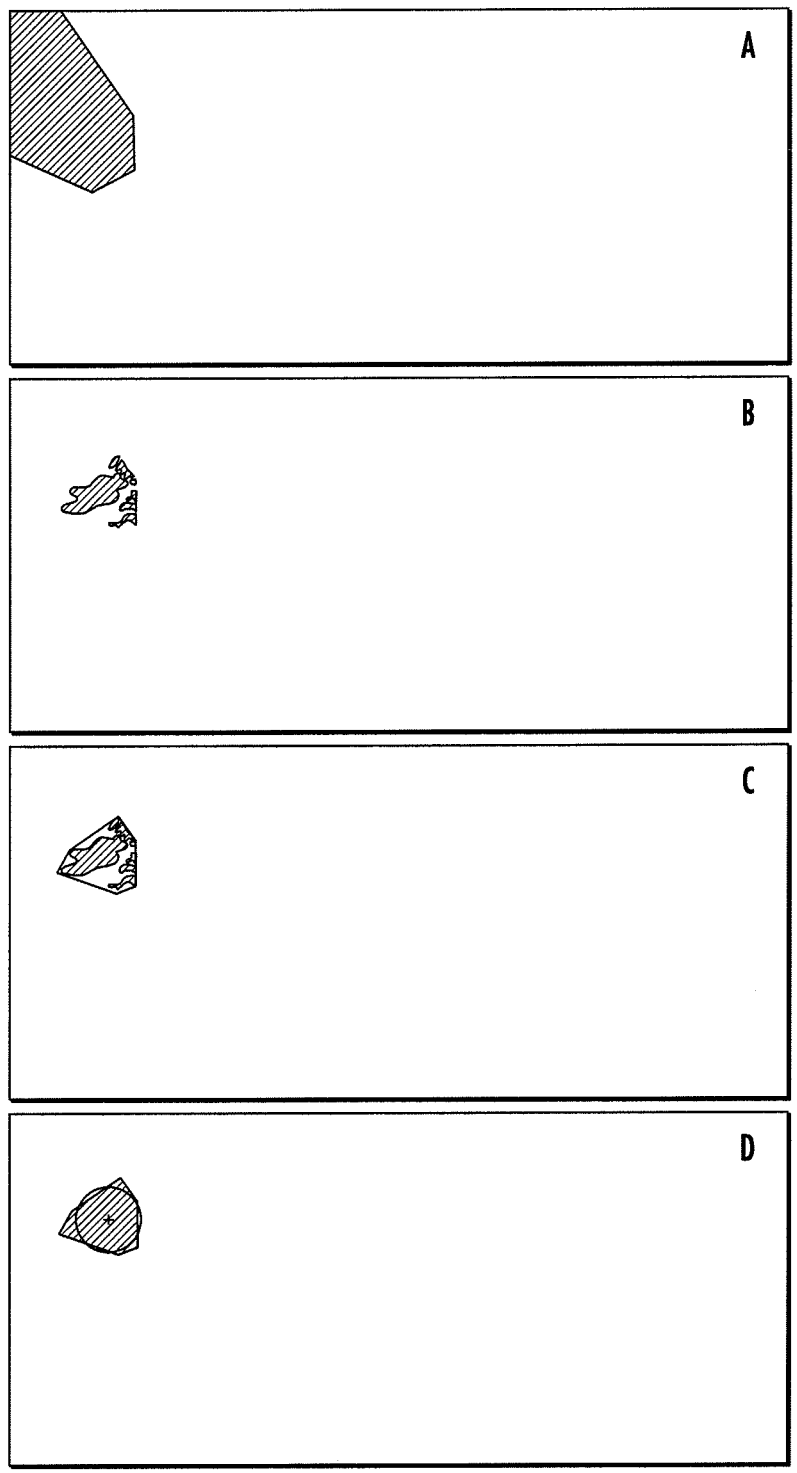
FIG. 20 illustrates a method of designing the radiation pattern of a beam associated to a Voronoi cell.

After that the Voronoi diagram has been calculated, the actual beam pattern can be designed. A simple design procedure comprises the following steps (FIG. 20):

finding the point on which each beam's radiation pattern should be centred. This may be done in a per Voronoi cell basis. For example the geometrical centroid or the centre-of-mass of the convex hull of the traffic demand footprint underneath the Voronoi cell may be used, the traffic demand footprint being defined as the region within the Voronoi cell wherein the traffic demand density is different from zero;

a circle is drawn, having the same area as the convex hull of the traffic demand footprint underneath the Voronoi cell and centred on the above-identified centroid;

this circle is taken to represent the footprint at −3 dB of the actual beam; a beam pattern having a profile (e.g. Gaussian, Bessel, etc.) satisfying this constraint and additional constraints depending e.g. on the satellite payload, is then selected.

More generally, the area of the beam footprint can be any increasing function of the area of the convex hull of the traffic demand footprint.

When the iterative process described above converges, it usually yields a pattern in which no two beams are the same. Having a customized beam per cell is advantageous from a performance standpoint, but it limits the feasibility of the system by complicating the antenna architecture. It is possible, though, to reduce the number of different beam sizes from N to M, without degrading significantly the system performance. An expedient way of doing so is by means of the Lloyd-Max quantization algorithm [7][8]. This method finds, for a given number of beam sizes N, the set of M values that minimize the average squared difference (least squares quantization) between the original size of the beams and the size they are finally assigned provided that each beam is assigned the beam size (of the new M beam sizes) that is the closest to the original one.

Once the final pattern of beams is ready, then each of them is assigned a frequency band and polarization accordingly to a uniform partitioning of the frequency and polarization resources between colours.

Figure 12:
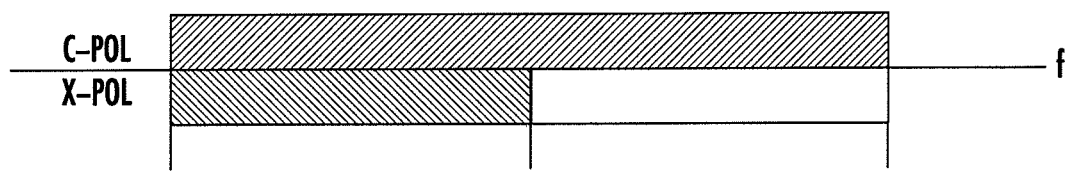
FIG. 12 illustrates a four "colour" frequency/polarization plan.

In a preferred embodiment of the invention the combination of frequency bands/polarizations to be used at system level is four in order to exploit the so-called four colour theorem. Accordingly to this result of topology, given any partition of a plane into contiguous regions no more than four colours are required to colour them so that no two adjacent regions have the same colour. Two regions are called adjacent only if they share a common boundary of non-zero length (i.e. other than a single point). In this particular case each region corresponds to a beam (or its corresponding Voronoi cell) and each "colour" corresponds to a pair (Frequency, Polarization). Hence, if two polarizations are allowed at system level then only 2 frequency bands are needed. On the other hand if only one polarization is used then 4 frequency bands are required. Dual polarized systems are common in practice since they provide double of capacity for the same bandwidth. This leads to four colour frequency plans as the one shown in FIG. 12.

In terms of payload implementation, the four colours frequency and polarization reuse allows sharing high power amplifiers (e.g. travelling wave tube TWTA or solid state power amplifiers SSPA) between two beams reducing the number of HPAs without sacrificing satellite capacity.

The assignment of a colour to a beam is known as the coverage colouring problem. It happens to be equivalent to a graph colouring problem where each vertex in the graph corresponds to a beam and two vertices are connected only if the beams they represent are neighbours.

Graph colouring is computationally difficult. There exist $c^n$ different ways of assigning c colours to n vertices in a graph. A brute force search of those which are four colour theorem (FCT) compliant is impractical. As a result, a common approach found in literature advocates finding just one FCT compliant solution. A method that can be used for this purpose is the backtracking algorithm.

Backtracking is a general algorithm for finding solutions to a computational problem incrementally building candidates to the solutions, and abandoning partial candidates ("backtracks") as soon as it is determined that they cannot be completed to a valid solution.

The backtracking algorithm by itself is blind in the sense that it colours the vertices while traversing the graph. If at some point the current colouring is not FCT compliant it goes a back and tries a different combination of colours. This algorithm has some drawbacks. First, it still is a brute force approach and second it does not take into account any kind of variable, except for the colour, to drive the process. To address this latter issue a new heuristic method is presented. This method is described here within the framework of the present invention; however, it can be applied to any case wherein it is necessary to assign a frequency band and a polarization state to a set of satellite beam realizing a non-uniform coverage of a region of interest.

Before describing the colouring method let's state the colouring problem in an algebraic way. Be the colouring matrix C defined as, $$C = \begin{bmatrix} c_{11} & \cdots & c_{1c} \\ \vdots & \ddots & \vdots \\ c_{n1} & \cdots & c_{nc} \end{bmatrix}_{nxc} \text{ where} \tag{21}$$

$$c_{ij} = \begin{cases} 1 & \text{if } i\text{-th beam uses the } j\text{-th colour} \\ 0 & \text{otherwise} \end{cases}$$

where n is the number of beams and c is the number of colours. Since a beam can only use one colour and all beams have to be coloured, it is necessary to impose the following condition, $$\sum_{j=1}^{c} c_{ij} = 1 \forall i \tag{22}$$

thus, $$\sum_{i=1}^{n} \sum_{j=1}^{c} c_{ij} = n \tag{23}$$

The pair-wise co-channel interference (CCI) matrix $\Delta$ is defined as, $$\Delta = \begin{bmatrix} \delta_{11} & \cdots & \delta_{1n} \\ \vdots & \ddots & \vdots \\ \delta_{n1} & \cdots & \delta_{nn} \end{bmatrix}_{nxn} \text{ where} \begin{cases} \delta_{ij} = j\text{-th to } i\text{-th beam } interf. \\ \delta_{ii} = 0 \end{cases} \tag{24}$$

$\delta_{ij}$ is measured at the centre of the i-th beam and, since identical power in all beams is assumed, it corresponds to the gain of the j-th beam at that point. Notice that in general $\Delta \neq \Delta^T$, except if the coverage is regular and all beams have the same radiation pattern.

The system CCI matrix T is then given by $$T = \Delta \cdot C \cdot C^T \tag{25}$$

so that the CCI experienced by the i-th beam is given by $\tau_{ii}$. Thus the total CCI in the system is, $$I = tr(T) = tr(\Delta \cdot C \cdot C^T) \tag{26}$$

The colouring problem consists of finding the matrix C that minimizes the expression above given the restriction $c_{ij} \in \{0,1\}$ and those stated in (22) and (23). It is important to note that the result will be certainly not unique since from an electromagnetic standpoint one coverage and all its colour permutations (c! in total) are equivalent (i.e. produce the same total CCI).

Finding such a matrix can be computationally hard; hence a heuristic method is presented.

Let the graph be represented by the vicinity matrix V such that, $$V = \begin{bmatrix} v_{11} & \cdots & v_{1n} \\ \vdots & \ddots & \vdots \\ v_{n1} & \cdots & v_{nn} \end{bmatrix}_{nxn} \text{ where} \tag{27}$$

$$v_{ij} = \begin{cases} 1 & \text{if the } i\text{-th and } j\text{-th beams are neighbours} \\ 0 & \text{otherwise} \end{cases}$$

Of course $V = V^T$. At any point of the execution of the algorithm, the available frequencies are given by the matrix A, $$A = \begin{bmatrix} a_{11} & \cdots & a_{1c} \\ \vdots & \ddots & \vdots \\ a_{n1} & \cdots & a_{nc} \end{bmatrix}_{nxc} \text{ where} \tag{28}$$

$$a_{ij} = \begin{cases} 1 & \text{if } i\text{-th beam can use the } j\text{-th colour} \\ 0 & \text{otherwise} \end{cases}$$

and it can be calculated as, $$A = \sim(V \cdot C) \tag{29}$$

The total CCI experienced by the beams at each colour is given by matrix F, $$F = \begin{bmatrix} f_{11} & \cdots & f_{1c} \\ \vdots & \ddots & \vdots \\ f_{n1} & \cdots & f_{nc} \end{bmatrix}_{nxc} \text{ where} \tag{30}$$

$f_{ij}$ = CCI experienced by the i-th beam at the j-th colour

It is calculated according to, $$F = \Delta \cdot C \tag{31}$$

Figure 13:
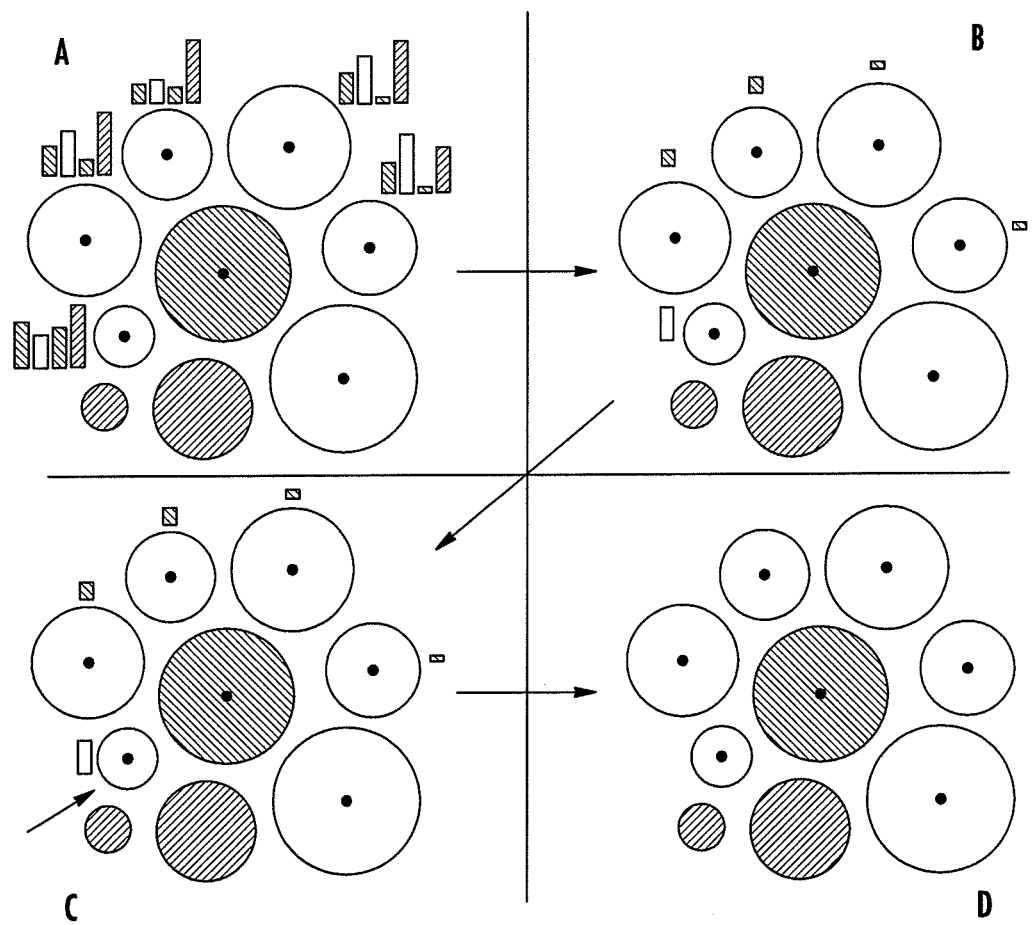
FIG. 13 illustrates a heuristic algorithm for assigning "colours" to satellite beams.

Using the matrices presented above, the procedure to colour the beams is the following. At each iteration, the algorithm selects those rows of F corresponding to uncoloured beams. Simply inspecting these rows allows determining the CCI experienced by the corresponding beam at each colour (FIG. 13, panel A). If a colour is to be assigned to a beam, the best candidate is the one that, being available, presents the minimum CCI. Hence each uncoloured beam is provisionally assigned, from its set of available colours, the one with the minimum CCI (FIG. 13, panel B).

The next step is to decide which beam from this set of provisionally coloured beams is the one to definitively keep its colour. That beam is the one with the highest CCI level (FIG. 13, panel C—the arrow points towards the selected beam—and panel D). By doing so one can expect that its CCI level will not be significantly increased since its neighbours will not be able to get the same colour and CCI is mainly generated by the closest beams. This way the algorithm tries to minimize the overall system CCI level. The process is illustrated by FIG. 13 and by equation (32).

$$\begin{bmatrix} f_{11} & \cdots & f_{1c} \\ \vdots & \ddots & \vdots \\ f_{n1} & \cdots & f_{nc} \end{bmatrix} \xrightarrow{Uncoloured} \begin{bmatrix} f_{11} & \cdots & f_{pc} \\ \vdots & \ddots & \vdots \\ f_{q1} & \cdots & f_{qc} \end{bmatrix} \xrightarrow{Available} \begin{bmatrix} \cdots \\ \vdots \vdots \vdots \vdots \vdots \\ \cdots \end{bmatrix} \xrightarrow{min} \begin{bmatrix} \cdot \\ \cdot \\ \cdot \end{bmatrix} \downarrow max \quad (32)$$

It has to be said that whenever a beam has just one remaining available colour it is immediately assigned. This way the ratio of FCT compliant solutions is increased.

Once the coverage layout and the colouring are finished then the performance of the solution can be assessed.

Finally, the obtained colour assignment is translated in an equivalent frequency and polarization reuse plan.

To implement the optimised coverage, different satellite payload architectures can be realised.

For example, the payload architecture can be based on a set of multibeam passive antennas with a single-feed-per-beam configuration. The minimum beamwidth is primarily determined by the reflector diameter and feed dimensions can be used to produce spot beams with different beamwidth.

Alternatively, the payload architecture can be based on a reduced number (i.e. potentially a single antenna) of multi-beam passive antennas in an array-fed configuration (e.g. array-fed-reflector, array-fed-lens or other optical systems fed by a common array) with fixed or reconfigurable (e.g. by means of ferrite microwave control elements) beamforming networks (in particular with lossless high power beamforming network for transmission).

Alternatively, the payload architecture can be based on a single transmit and a single receive active antennas with distributed amplification and reconfigurable beamforming.

The payload architectures based on single-feed-per-beam or fixed beamforming cannot be reconfigured in orbit so that the multibeam layout must be designed having in mind the traffic evolution within the ROI. Additional payload flexibility means (e.g. flexible-TWTA, multiport-amplifiers, etc.) can offer the capability to adapt to traffic variations during the lifetime of the satellite.

Payload architectures based on reconfigurable beamforming allow to modify the multibeam layout during the satellite lifetime as well as to adapt on a short/medium time scale the coverage to the time-varying traffic distribution.

Figure 14:
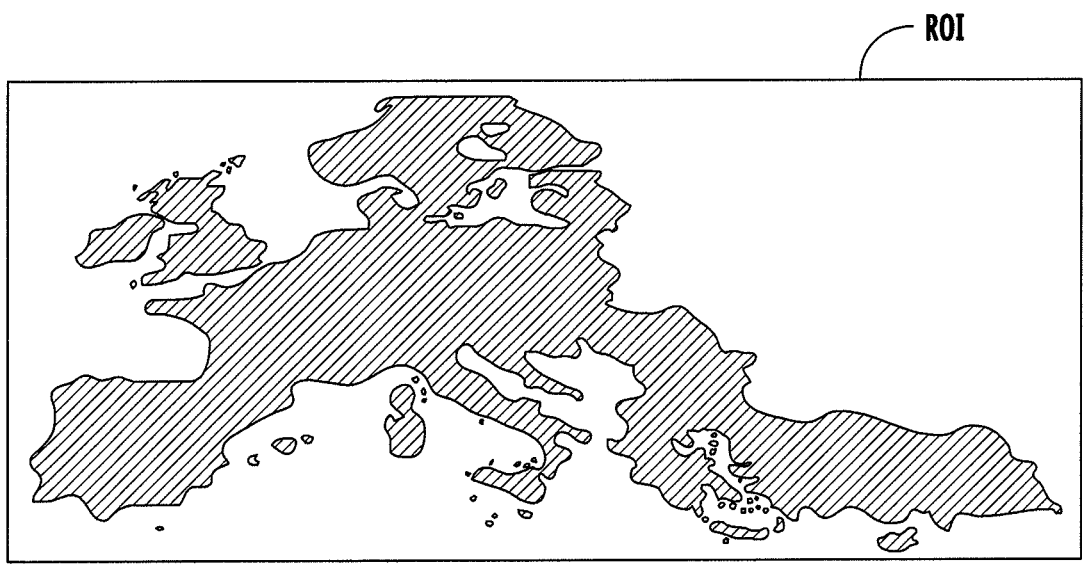
FIGS. 14-16, 19 and 21 illustrate an exemplary embodiment of the invention.

The invention was tested assuming N=70 beams and using a traffic distribution based on Europe's population density as seen from a geostationary satellite located at 3.167° E, as illustrated on FIG. 14.

Figure 15:
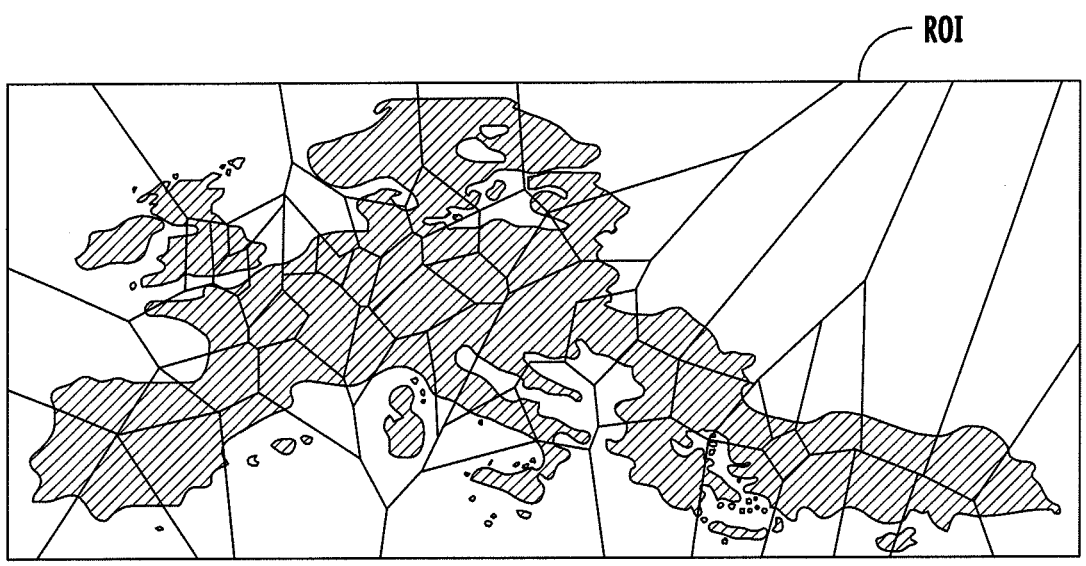
Figure 16:
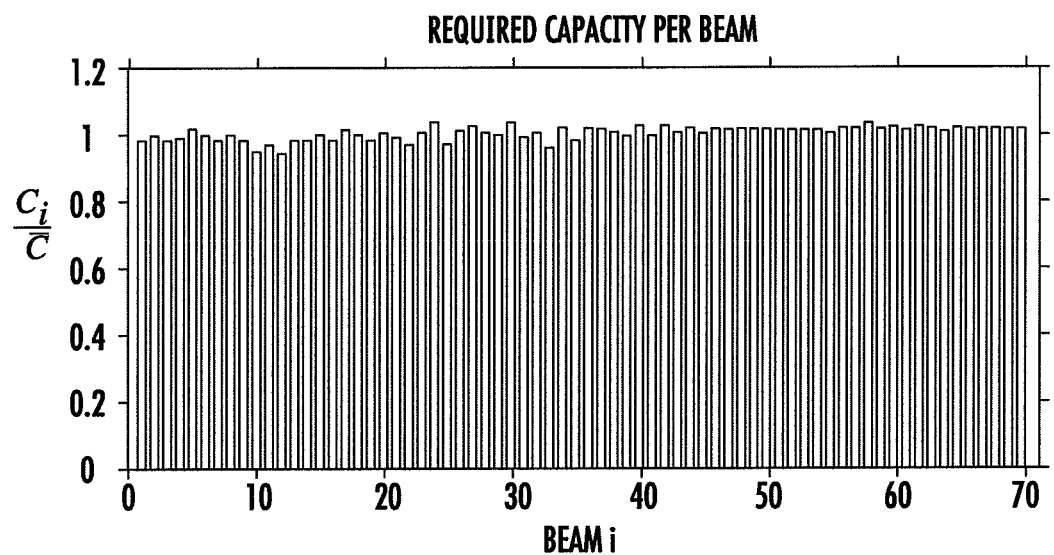

After several iterations the process converged into the coverage presented in FIG. 15. The traffic load is presented in FIG. 16.

Figure 17:
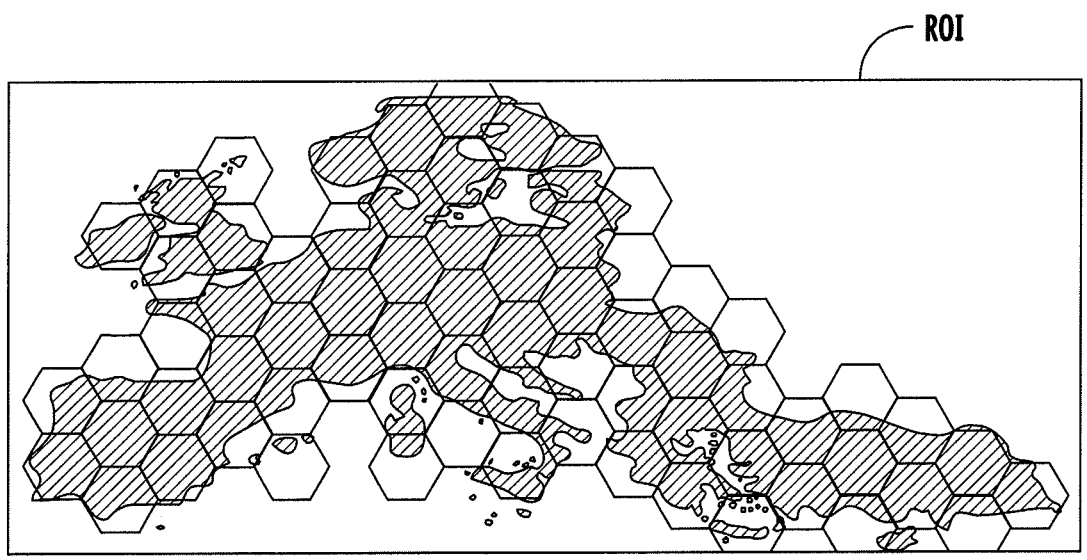
FIGS. 17, 18 and 22 illustrate a comparative example, based on a conventional regular coverage of the ROI.
Figure 18:
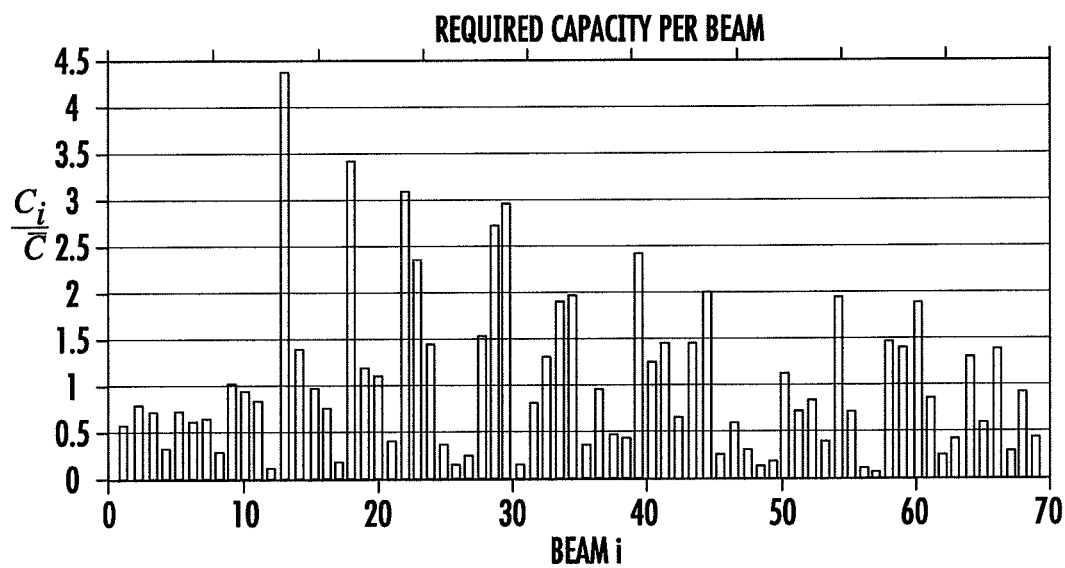

For comparison purposes a regular coverage with the very same number of beams was setup (FIG. 17) and the traffic load measured (FIG. 18)

These results make clear the traffic load balancing capabilities of the proposed coverage design.

Figure 19:
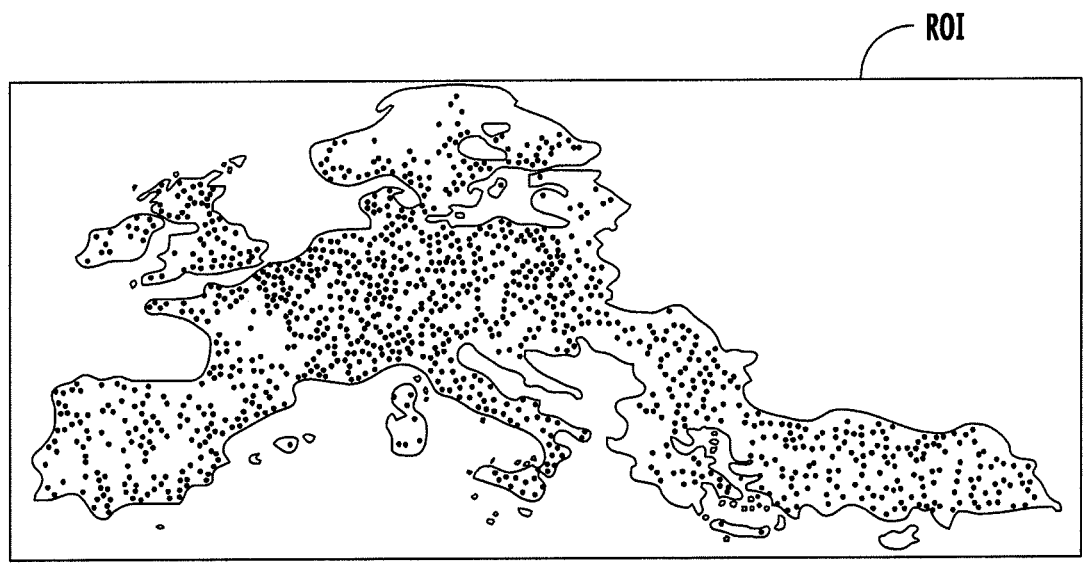

The usable capacity analysis was made through multidimensional link budget simulations with adaptive coding and modulation. For undertaking the simulations a random set of 2680 ground terminals was generated using the traffic distribution as probability density function (see FIG. 19).

Figure 21:
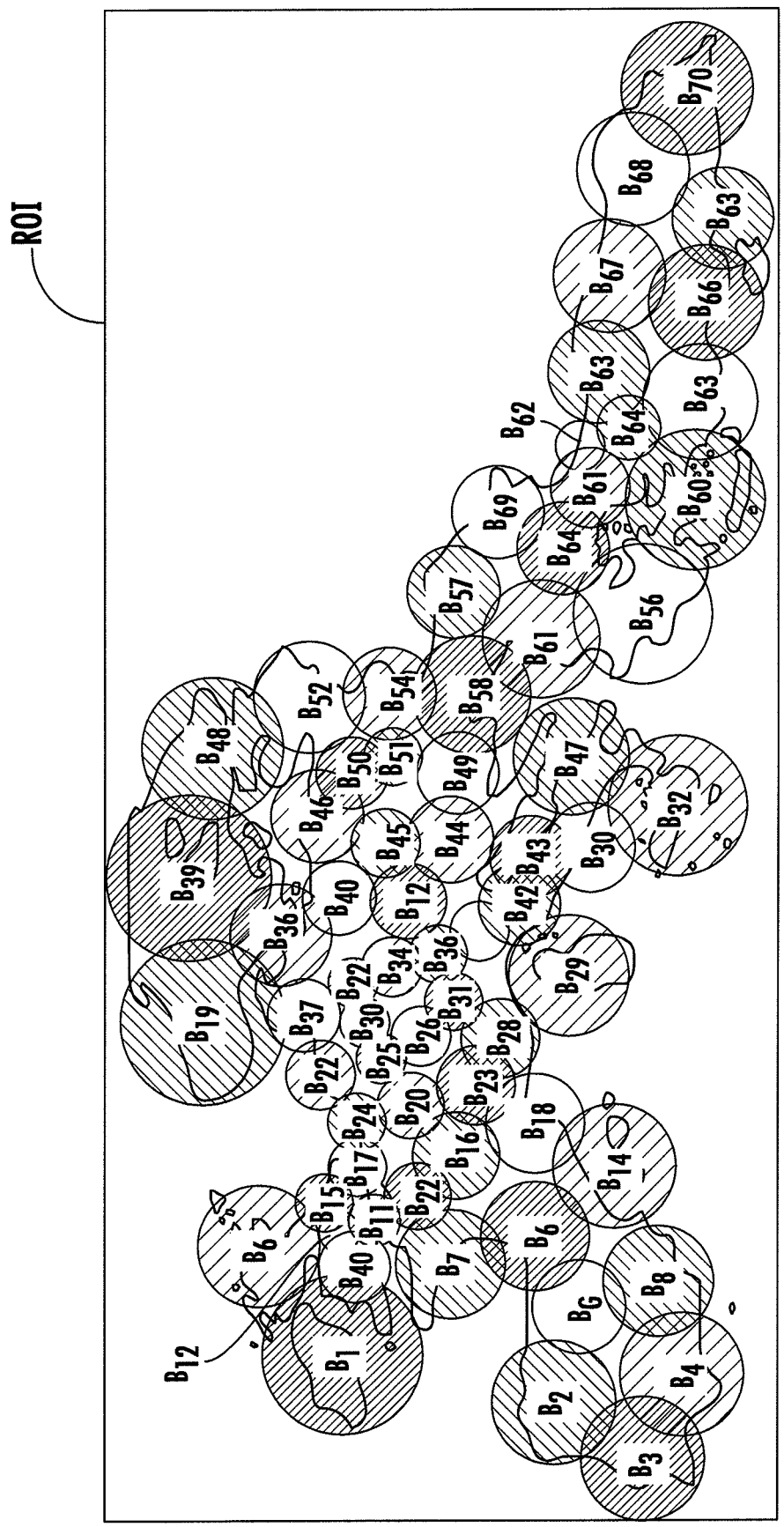

In the case of the non-regular coverage payload, the Voronoi cells shown in FIG. 15 are served by circular beams. The final layout and frequency plan is shown in FIG. 21 according to FIG. 12. Each circle represents the antenna half peak gain of a beam (radiation pattern 3 dB cut). The area of each circle is the same as the one of the convex hull of the traffic demand footprint underneath the Voronoi cell it serves and it is centred at the geometrical centroid (centre-of-mass) of the convex hull.

For the regular coverage payload the hexagonal cells are also served by circular beams. Each beam circumscribes the cell it serves. The final layout and frequency plan is shown in FIG. 22 according to FIG. 12.

Figure 22:
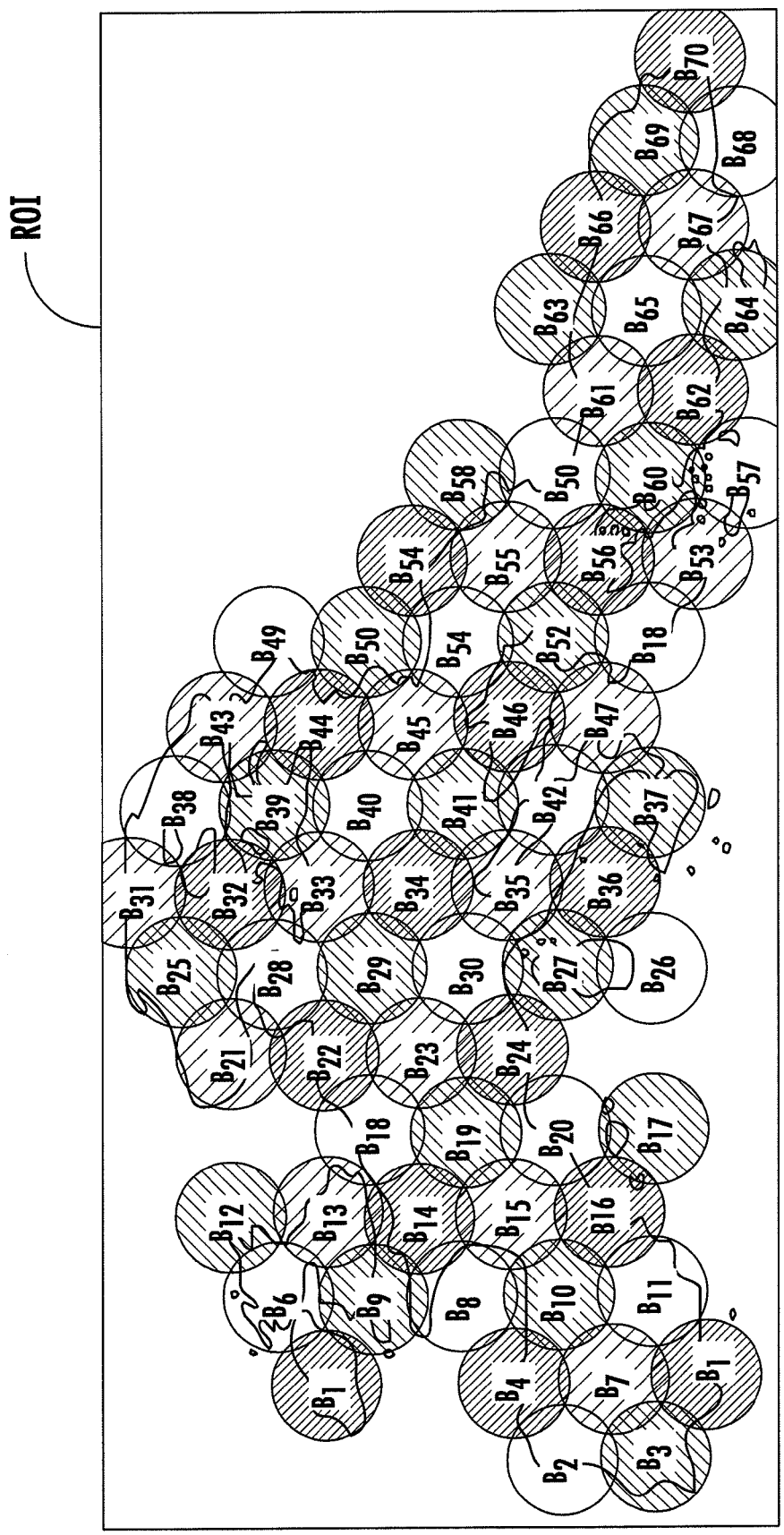

Circles shown in FIG. 21 and FIG. 22 are not the radiation diagram itself but rather a mask that any radiation diagram must comply with, thus different compliant radiation patterns can be used. In this particular case two different radiation diagrams were chosen with very satisfactory results.

The first radiation diagram is the one produced by an aperture in which the amplitude of the electric field follows a Gaussian function. Supposing that the electric field is given by equation (33) then the radiation pattern happens to be another Gaussian function (34). The advantage of this kind of apertures is that they have no or very low side lobes, therefore the interference produced to other beams that use the same frequency and polarization is very low.

$$E = E_0 e^{-\frac{r^2}{2\sigma^2}} \hat{x} \quad (33)$$

$$G(\theta) = 16\pi^2 \sigma^2 \left(\frac{1+\cos\theta}{2}\right)^2 e^{-4\pi^2 \sigma^2 \sin^2\theta} \text{ with } \overline{\sigma} = \frac{\sigma}{\lambda} \quad (34)$$

The second radiation pattern is an analytical model that corresponds to a more realistic antenna that can be found in a standard telecommunication satellite. Assuming that the amplitude of the electric field on a circular reflector of radius a corresponds to an inverted parabola with certain degree of tapering T (35) then the radiation pattern is given by (36). $\Lambda_p(x)$ is the lambda function defined by Jahnke and Emde [6] as defined in (37) where $J_p(x)$ is the Bessel function of the first kind and order p. The lambda function is normalized so that $\Lambda_p(0)=1$. This pattern has higher side lobes (25 dB side lobe level) and that makes it account better for the inter beam interference that would appear in an actual system.

$$i_{T,p}(r) = (1-T) + T\left(1 - \left(\frac{r}{a}\right)^2\right)^p \quad (35)$$

$$G(\theta) = G_0 \left[ \frac{1}{(1-T) + \frac{T}{p+1}} \left[ \frac{(1-T)\Lambda_1(2\pi\overline{a}\sin\theta) + }{\frac{T}{p+1}\Lambda_{p+1}(2\pi\overline{a}\sin\theta)} \right] \right]^2 \quad (36)$$

$$\Lambda_p(x) = 2^p \Gamma(p+1) \frac{J_p(x)}{x^p} \quad (37)$$

$$G_0 = (2\pi \bar{a})^2 \frac{\left[(1-T) + \frac{T}{p+1}\right]^2}{\left[(1-T)^2 + \frac{2(1-T)T}{p+1} + \frac{T^2}{2p+1}\right]} \quad (38)$$

$$\bar{a} = \frac{a}{\lambda} \quad (39)$$

These two radiation patterns correspond to the best case (Gaussian) and average case (analytical model) scenarios capacity wise.

For the simulations it was assumed a 500 MHz band around 19.95 GHz using two polarizations. The frequency band was divided into 8 channels of 62.5 MHz each, allowing a symbol rate of 45 MBaud per carrier. Each beam was assigned one half of the band in any of the polarizations (one colour); therefore there are 4 channels per beam. On the payload side a non-flexible standard payload consisting of 35 standard TWTAs was chosen. The TWTAs had an output RF power of 131 W and 500 MHz bandwidth; hence each TWTA amplifies two beams simultaneously. The air interface was DVB-S2 and the total traffic demand 50000 Mbps.

The results obtained using the Gaussian radiation pattern are shown in the following table:

| Payload | Traffic Demand [Mbps] | Offered Capacity [Mbps] | Usable capacity [Mbps] | Not used [Mbps] | Unmet Capacity [Mbps] | Improvement [%] |
|---|---|---|---|---|---|---|
| Non-regular | 50000 | 48400.026 | 47275.282 | 1124.745 | 2724.708 | 42 |
| Conventional | 50000 | 39043.173 | 33275.607 | 5767.567 | 16724.342 | |

The results obtained using the circular aperture analytical model are shown in the following table:

| Payload | Traffic Demand [Mbps] | Total Capacity [Mbps] | Usable capacity [Mbps] | Not used [Mbps] | Unmet Capacity [Mbps] | Improvement [%] |
|---|---|---|---|---|---|---|
| Non-regular | 50000 | 30393.939 | 30335.060 | 58.878 | 19664.931 | 47 |
| Conventional | 50000 | 21242.903 | 20639.902 | 603.003 | 29360.047 | |

These results clearly show that no matter what radiation diagram is used, a non-regular coverage multibeam payload provides a considerably higher usable capacity to the system when compared with a classical regular coverage multibeam payload.

The invention has been described on the basis of a number of embodiments, which are exemplary and non limitative. Several variants of the described methods and systems can be devised within the scope of the present invention. For example:

It has been implicitly assumed that the satellite beams are transmit beams implementing a downlink; however, they can also be receive beams (i.e. radiation lobes of the radiation pattern of a receiving antenna) implementing an uplink.

The multi-beam coverage can be realized by a single multi-beam satellite, as described or by several satellites (in a limiting case: by N single-beam satellites);

Implementation of the invention is not limited to Ka-band.

Particularly efficient algorithms for positioning the generator points of the Voronoi diagram and for allocating "colours" have been disclosed, by alternative algorithms (e.g. "brute force" ones) can also be used.

The present "Traffic Load Transfer" can be combined with conventional "Usable Capacity Transfer", although at the expense of an increased complexity of the payload.

Shaped satellite beams can be used instead of circular ones.

Beam centring may be based on any kind of criteria, not only on geometrical or traffic considerations.

REFERENCES

[1] P. Angeletti, M. Lisi, "Multiport Power Amplifiers for Flexible Satellite Antennas and Payloads", Microwave Journal, Vol. 53, No. 5, May 2010.

[2] M. Khilla, W. Gross, H. Schreiber, D. Leucht, "Flexible Ka-Band LCAMP for In-Orbit Output Power Adjustable MPM", 23rd AIAA Int. Communications Satellite Systems Conf. (ICSSC), Rome, 2005.

[3] R. Rinaldo, X. Maufroid, R. Casaleiz Garcia, "Non-Uniform Bandwidth and Power Allocation in Multi-Beam Broadband Satellite Systems", Proceedings of the 23rd AIAA International Communications Satellite Systems Conference (ICSSC 2005), Rome, Italy, September 2005.

[4] A. Malarky, T. Stajcer, T. Jones, J. Dorey, "A Near-term Solution to Providing Flexibility in Multi-beam Communications Payloads", Proceedings of the 25th AIAA International Communications Satellite Conference (ICSSC 2007), Seoul, Korea, 11-13 Apr. 2007.

[5] Anzalchi J., Harverson M., "Generic Flexible Payload Technology for Enhancing In-orbit Satellite Payload Flexibility", Proceedings of the 25th AIAA International Communications Satellite Conference (ICSSC 2007), Seoul, Korea, 11-13 Apr. 2007.

[6] E. Jahnke, F. Emde, Tables of Functions with Formulae and Curves, 4th Ed., Dover, N.Y., 1945.

[7] Lloyd, S. P., "Least Squares Quantization in PCM," IEEE Transactions on Information Theory, Vol. IT-28, March, 1982, pp. 129-137.

[8] Max, J., "Quantizing for Minimum Distortion," IRE Transactions on Information Theory, Vol. IT-6, March, 1960, pp. 7-12.

The invention claimed is:

1. A method, by a satellite communication system comprising at least one satellite directing N>1 satellite beams toward a Region of Interest, of providing multi-beam coverage to said Region of Interest over which a non-uniform traffic demand density is defined wherein the method comprises:

receiving an estimation or measure of the traffic demand density over the Region of Interest;

partitioning said Region of Interest, based on the received estimation or measure of the traffic demand density over the Region of Interest, into N>1 non-overlapping cells ($V_1$-$V_{10}$, $V_i$) such that the integrated traffic demand within each cell is substantially uniform across cells, wherein said partitioning said Region of Interest into N>1 non-overlapping cells is performed by an iterative algorithm comprising the steps of:

a. defining a set of N generator points ($p_1$-$p_{10}$, $p_i$) distributed over said Region of Interest;

b. determining a set of N Voronoi cells for said generator points, partitioning said Region of Interest;
c. determining an integrated traffic demand for each of said Voronoi cells; and
d. iteratively adjusting the positions of said generator points so as to make the integrated traffic demand associated to said Voronoi cells substantially uniform, wherein said step d. of iteratively adjusting the positions of said generator points is carried out by displacing the generator point corresponding to each Voronoi cell towards generators points whose corresponding Voronoi cells have a higher traffic demand, and away from generator points whose corresponding Voronoi cells have a lower integrated traffic demand; and generating, by said at least one satellite, N satellite beams ($B_1$-$B_{70}$, $B_i$), each of said satellite beams providing coverage of a respective cell.

2. A method according to claim 1, wherein the displacement of each generator point is expressed as a monotone function of a vector sum of contributions associated to respective generator points others than the one to be displaced, each of said contributions having a magnitude which increases with difference in integrated traffic demand between the Voronoi cell corresponding to the respective generator point and the Voronoi cell of the generator point to be displaced, and which decreases with the distance between said generator points.

3. A method according to claim 1, wherein said step d. of iteratively adjusting the positions of said generator points is repeated until an absolute value of the difference between the traffic demand of each Voronoi cell and an average traffic demand becomes lower or equal to a predetermined threshold, or until a predetermined number of iterations has been performed.

4. A method according to claim 1, comprising generating, for at least some of said cells, a circular satellite beam centred on a point of a respective cell and having a width at half peak gain which is an increasing function of an area of a convex hull of a traffic demand footprint underneath said cell.

5. A method according to claim 4, wherein the width of each said circular satellite beam is chosen among M predetermined values, with 1<M<N, said M values being chosen such that they minimize an average squared difference between said widths and nominal widths of the beams, the nominal width of each beam corresponding to a beam area at half peak gain proportional to the area of said convex hull of the traffic demand footprint underneath the corresponding cell.

6. A method according to claim 1, further comprising a step of assigning a frequency band/polarization state pair, among a number of frequency band/polarization state pairs, to each satellite beam, the number of frequency band/polarization state pairs being lower than the number N of satellite beams, said step being performed so as to minimize the interference level between beams sharing a same frequency band and a same polarization state.

7. A method according to claim 6, wherein two non-overlapping frequency bands and two orthogonal polarization states are used.

8. A method according to claim 6, wherein said step of assigning a frequency band and a polarization state to each satellite beam comprises the following sub-steps:
  i. assigning a frequency band and a polarization state to a satellite beam;
  ii. for each satellite beam to which a frequency band and a polarization state have not been assigned, computing an interference level for each frequency band/polarization state pair;
  iii. provisionally allotting to each said satellite beam to which a frequency band and a polarization state have not been assigned the frequency band/polarization state pair with the lowest interference level;
  iv. identifying, among said satellite beams to which a frequency band/polarization state pair has been provisionally allotted, the one which is affected by the highest interference level, and assigning it the provisionally allotted frequency band/polarization state pair; and
  v. repeating sub-steps ii.-iv. until all the satellite beams have been assigned a frequency band and a polarization state.

9. A satellite communication system comprising at least one satellite directing N>1 satellite beams ($B_1$-$B_{70}$, $B_i$) toward a Region of Interest over which a non-uniform traffic demand density is defined,
   wherein said system is configured to receive an estimation or measure of the traffic demand density over the Region of Interest, and to partition said Region of Interest, based on the received estimation or measure of the traffic demand over the Region of Interest, into N>1 non-overlapping cells ($V_1$-$V_{10}$, $V_i$),
   wherein said partitioning said Region of Interest into N>1 non-overlapping cells is performed by an iterative algorithm comprising the steps of:
   a. defining a set of N generator points ($p_1$-$p_{10}$, $p_i$) distributed over said Region of Interest;
   b. determining a set of N Voronoi cells for said generator points, partitioning said Region of Interest;
   c. determining an integrated traffic demand for each of said Voronoi cells; and
   d. iteratively adjusting the positions of said generator points so as to make the integrated traffic demand associated to said Voronoi cells substantially uniform,
   wherein said step d. of iteratively adjusting the positions of said generator points is carried out by displacing the generator point corresponding to each Voronoi cell towards generators points whose corresponding Voronoi cells have a higher traffic demand, and away from generator points whose corresponding Voronoi cells have a lower integrated traffic demand, and
   wherein said system is further configured to generate and direct N satellite beams such that each said satellite beam is directed so to provide coverage of a respective cell, wherein said Region of Interest is partitioned in such a way that an integrated traffic demand associated to said cells is substantially uniform.

10. A satellite communication system according to claim 9 wherein said cells form a Voronoi diagram defined over said Region of Interest, each satellite beams being centred on a point of a respective Voronoi cell.

11. A satellite communication system according to claim 10 wherein said satellite beams are circular and each of them has a width at half intensity which is an increasing function of an area of a convex hull of a traffic demand footprint underneath the corresponding Voronoi cell.

12. A satellite communication system according to claim 11, wherein the width of each said circular satellite beam is chosen among M values, with 1<M<N, said M values being chosen such that they minimize an average squared difference between said widths and nominal widths of the beams, the nominal width of each beam corresponding to a beam area at half peak gain proportional to the area of said convex hull of the traffic demand footprint underneath the corresponding Voronoi cell.

13. A satellite communication system according to claim 9, wherein a frequency band/polarization state pair, among a number of frequency band/polarization state pairs, are assigned to each satellite beam, the number of frequency band/polarization state pairs being lower than the number N of satellite beams, wherein the assignment is performed so as to minimize an interference level between beams sharing a same frequency band and a same polarization state.

14. A satellite communication system according to claim 13, wherein two non-overlapping frequency bands and two orthogonal polarization states are used.

* * * * *